United States Patent
Carney

(10) Patent No.: US 6,228,792 B1
(45) Date of Patent: *May 8, 2001

(54) DONOR-MODIFIED OLEFIN POLYMERIZATION CATALYSTS

(75) Inventor: Michael John Carney, Eldersburg, MD (US)

(73) Assignee: W. R. Grace & Co.-Conn., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,615

(22) Filed: Feb. 27, 1998

(51) Int. Cl.[7] ..................................................... B01J 31/18
(52) U.S. Cl. .......................... 502/123; 502/104; 502/115; 502/132; 502/134; 526/129; 526/156; 526/124.3
(58) Field of Search ..................................... 526/129, 156, 526/124.3; 502/104, 115, 123, 132, 134

(56) References Cited

U.S. PATENT DOCUMENTS

| | | | |
|---|---|---|---|
| 4,107,413 | 8/1978 | Giannini et al. | 526/114 |
| 4,252,670 | 2/1981 | Caunt et al. | 252/429 |
| 4,263,168 | 4/1981 | Rochefort et al. | 252/429 |
| 4,301,029 | 11/1981 | Caunt et al. | 252/429 B |
| 4,324,691 | 4/1982 | Hartshorn et al. | 252/429 B |
| 4,381,252 | 4/1983 | Sakurai et al. | 252/429 B |
| 4,410,672 | 10/1983 | Inazawa | 526/124 |
| 4,468,477 | 8/1984 | Caunt et al. | 502/104 |
| 4,471,066 | 9/1984 | Sakurai et al. | 502/113 |
| 4,496,660 | 1/1985 | Gessell et al. | 502/111 |
| 4,826,794 | 5/1989 | Coosemans et al. | 502/110 |
| 5,045,597 | 9/1991 | Asanuma et al. | 525/72 |
| 5,064,799 | * 11/1991 | Monte et al. | 526/129 |
| 5,118,768 | 6/1992 | Job et al. | 526/124 |
| 5,134,209 | 7/1992 | Job et al. | 526/141 |
| 5,139,985 | 8/1992 | Barbe et al. | 502/109 |
| 5,164,352 | 11/1992 | Job et al. | 502/124 |
| 5,182,245 | * 1/1993 | Arzoumanidis et al. | 526/125.6 |
| 5,229,477 | 7/1993 | Job et al. | 526/141 |
| 5,543,458 | 8/1996 | Hoxmeier et al. | 525/271 |
| 5,550,194 | 8/1996 | Hoxmeier et al. | 525/250 |
| 5,596,076 | 1/1997 | Hafner et al. | 528/483 |
| 5,633,419 | 5/1997 | Spencer et al. | 585/522 |

FOREIGN PATENT DOCUMENTS

| | | | |
|---|---|---|---|
| 0032307 | 7/1981 | (EP) | C08F/10/00 |
| 32209 | 7/1981 | (EP) | C08F/10/00 |
| 0136163 | 4/1985 | (EP) | C08F/10/00 |
| 171200 | 2/1986 | (EP) | C08F/10/00 |
| 0193280 | 9/1986 | (EP) | C08F/4/64 |
| 0208524 | 1/1987 | (EP) | C08F/4/64 |
| 0506074 | 9/1992 | (EP) | C08F/4/654 |
| WO 96/05236 | 2/1996 | (WO) | C08F/10/00 |
| WO 97/48742 | 12/1997 | (WO) | C08F/10/00 |

* cited by examiner

*Primary Examiner*—David W. Wu
*Assistant Examiner*—Ling-Siu Choi
(74) *Attorney, Agent, or Firm*—Robert A. Maggio

(57) ABSTRACT

Supported Ziegler-Natta catalyst component adapted for the polymerization of ethylene is provided. More specifically, certain organomagnesium compounds (e.g., dibutylmagnesium) which do not contain an oxygen linkage between the organo moiety and the magnesium are impregnated into a porous inorganic oxide support (e.g., agglomerated silica particles) to form a first reaction product. The first reaction product is halogenated, e.g., with HCl, to convert the organomagnesium derived component to $MgCl_2$ thereby forming a second reaction product. The second reaction product is then treated with a transition metal compound (e.g., $TiCl_4$), a particular type of electron donor (e.g., 2,6-dimethyl pyridine) and optionally at least one Group 2 or 13 organo metal compound (e.g., diethylaluminum chloride). The combination of the particular organomagnesium compounds and electron donor impart a low melt flow ratio and enhanced activity to resulting catalyst component.

12 Claims, No Drawings

DONOR-MODIFIED OLEFIN POLYMERIZATION CATALYSTS

This invention concerns catalysts and components thereof supported on a porous medium, their method of preparation, and their use for the polymerization of ethylene.

Olefin monomers, such as ethylene, propylene, and the higher alpha-olefins, can be polymerized using the so-called Ziegler-Natta catalysts. The term "Ziegler-Natta catalyst" is generally used to mean a catalyst system obtained from a compound of a transition metal of Groups 4 to 6 of the Periodic Table, together with an organo-metallic compound of a non-transition metal of Groups 1, 2 and 13 of the Periodic Table.

The particular composition of Ziegler-Natta catalyst is for the most part dictated and controlled by properties sought to be imparted to polymer made from the catalyst and the particular configuration in which the polymer will be utilized.

In this regard, it is well known that polyethylene is associated with different property goals than polymers made from higher alpha-olefins such as propylene, in that, unlike propylene, polyethylene does not have multiple stereo specific configurations which need to be controlled.

For example, polypropylene can be characterized as crystalline or amorphous. It is normally accepted that crystalline polypropylene generally has the isotactic or syndiotactic structure and that amorphous polypropylene generally has considerable atactic structure. Giulio Natta's U.S. Pat. Nos. 3,112,300 and 3,112,301 describe isotactic polypropylene and give structural formulae for isotactic and syndiotactic polypropylene. The isotactic configuration is a straight chain of propylene units wherein the pendant methyl groups are all aligned on one side of the polymer chain. In the syndiotactic configuration, the pendant methyl groups are uniformly alternated from one side of the chain to the other. In atactic polypropylene, the methyl groups are arranged randomly on the two sides of the chain.

Almost all of the polypropylene which is used commercially is crystalline isotactic polypropylene. These products are well known and have been the subject of many patents and articles. Amorphous polypropylenes, which have very little strength, are used commercially, primarily in adhesives and asphalt additives.

Thus, Ziegler-Natta catalysts which are designed to impart a desired stereoregularity to propylene polymers and copolymers may not be particularly suited for the preparation of ethylene polymers and copolymers where stereoregularity is not a factor to be controlled. Similarly, a Ziegler-Natta catalyst designed for polymerizing ethylene may exhibit poor activity and stereoregularity when used for polymerizing propylene.

More specifically, one property frequently sought to be controlled in the polymerization and copolymerization of ethylene is the molecular weight distribution (MWD) of the polymer.

It is desired to produce an ethylene polymer having a narrow distribution of molecular weight to render it suitable for use in injection molding and to provide film having excellent optical and strength characteristics. When ethylenic polymer prepared by polymerizing ethylene alone or copolymerizing with α-olefin is subjected to solvent extraction analysis using a solvent such as cyclohexane, the amount of extremely low molecular weight polymer found in the extract is related to the MWD of the polymer. The presence of such extremely low-molecular weight polymers causes problems during processing of the polymer, such as smoking, nozzle dirt (dirt formed by the oozing of extremely low molecular weight polymers from molds) and unpleasant odor. Furthermore, in the course of the polymerization of the ethylenic polymer, fouling (i.e., attachment of polymers to the walls of a reactor and other apparatuses) or bridging in a hopper in the after-treating step (e.g., pelletizing step) can occur.

These phenomena are more prominent in the case of copolymers prepared by copolymerizing ethylene with α-olefin. Particularly, in the case of medium density polyethylene comprising ethylene and a relatively large amount of α-olefin and low density polyethylene, the extract content using a solvent such as n-hexane increases. This extract is composed of extremely low molecular weight polymers and extremely low density polymers. The amount of the extremely low density portion is determined by the breadth of the distribution of densities (the distribution of degrees of branching) which occurs during the copolymerization.

One test method which is indicative of MWD is the melt flow ratio (MFR) of the polymer, namely, the lower the MFR the narrower the MWD. Thus, for the polymerization of ethylene, one seeks to minimize MFR and maximize activity (expressed in polymer grams per gram of catalyst) for certain end use applications such as injection molding, film forming, and the like.

Accordingly, for ethylene polymerization, typical known catalysts contain a magnesium dihalide and a Ti compound supported on a porous medium containing inorganic oxides, such as silica, alumina, and others.

Such catalyst components can be obtained by impregnating the porous support medium with a solution of a magnesium compound capable of being transformed into magnesium halide or dihalide by reaction with a halogenating agent, evaporating the solvent, and treating the solid thus obtained with a titanium compound such as $TiCl_4$.

For propylene and higher olefin polymerizations, typical Ziegler-Natta catalysts do not employ porous supports of silica or alumina, and typically rely instead on magnesium halide to support a titanium compound. While there have been proposals to support the Ziegler-Natta catalyst components on a support, such supported catalysts typically have been of lower activity.

The process variations for preparation of these basic types of catalysts are quite numerous, and activity enhancements are continually being sought.

It is also known to modify such catalysts with an electron donor, sometimes also referred to as a Lewis Base. The use of electron donors is quite common for both ethylene and propylene polymerization. However, the electron donor is typically employed for polypropylene catalysts to improve or control stereospecificity. However, should the catalysts be modified with electron donor compounds in order to render them stereospecific and thus suited for stereoregular polymerization of propylene or other alpha-olefins, one often observes a considerable reduction in activity relative to use for ethylene polymerization.

The present invention is based in part on the discovery that certain hindered aromatic nitrogen heterocyclic compounds, when used as electron donors for certain Ziegler-Natta catalysts adapted for ethylene polymerization, improve (i.e. decrease) the MFR of the polymers. Improvements (increases) in polymer bulk density also are observed.

The broad use of nitrogen or amine containing compounds as electron donors for various Ziegler-Natta catalysts is disclosed in the following patents: U.S. Pat. Nos. 4,381,252; 4,496,660; 4,826,794; 5,064,799; 5,139,985; 5,633,419; and EP 506,704.

The use of pyridine as an electron donor for various types of Ziegler-Natta catalysts is disclosed in the following patents: U.S. Pat. Nos. 4,252,670; 4,263,168; 4,301,029; 4,324,691; 4,410,672; 4,468,477; and EP 136,163.

The use of substituted pyridines, but not lutidine (2,6-dimethyl pyridine), as electron donor for various types of Ziegler-Natta catalysts is disclosed in the following patents: U.S. Pat. Nos. 4,107,413 (2-dimethylamino pyridine), and 4,471,066 (methyl pyridine); EP No. 193,280 (2-methyl pyridine; 2,6-diisopropyl pyridine), and EP No. 208,524 (methyl substituted pyridine, i.e. 2-, 3-, or 4-methyl pyridine).

The use of lutidine as a selectivity control agent in the polymerization of ethylene/propylene to form rubbery copolymers having enhanced randomness to improve the elastomeric and hence processibility properties of the polymer is disclosed in U.S. Pat. No. 5,134,209. However, the internal electron donors employed for the catalyst do not include amines. (See also U.S. Pat. No. 5,229,477.) It will be further noted that these patents disclose and employ only magnesium compounds as components for Ziegler-Natta catalysts which contain mg-oxygen linkages, e.g. Mg-alkoxides.

The following U.S. Patents disclose the use of hindered heterocyclic aromatic nitrogen compounds as electron donors for Ziegler-Natta catalysts intended for the polymerization of various monomers: U.S. Pat. Nos. 5,118,768; 5,164,352; 5,543,458; and 5,550,194.

More specifically, U.S. Pat. Nos. 5,118,768 and 5,164,352 disclose the use of hindered heterocyclic aromatic nitrogen compounds such as lutidine, as electron donors for the formation of elastomeric, primarily isotactic polymers. These particular electron donors are employed to provide stereo chemical control of the polymerization to increase the isotactic nature of the polymer. However, these electron donors are employed with Ziegler-Natta catalysts which are the reaction product of a magnesium alkoxide compound and a tetravalent titanium halide in the presence of the electron donor. Moreover, the catalyst is not supported on silica.

U.S. Pat. Nos. 5,543,458 and 5,550,194 contain similar disclosures of Ziegler-Natta catalysts which employ a variety of electron donors, including heterocyclic aromatic nitrogen compounds such as 2,6-lutidine. Each of these patents refers to U.S. Pat. No. 5,045,597 for a generalized description of suitable stereoregular Ziegler-Natta catalyst components. None of the electron donors disclosed in the '597 patent include heterocyclic aromatic nitrogen compounds. The primary catalyst components are transition metal compounds, e.g. Ti-halide, which can be supported on magnesium halide, and an organoaluminum compound. Silica is not disclosed as a support.

Moreover, the preferred magnesium compounds in both the '458 and '194 patents are also alkoxides.

Spencer et al, U.S. Pat. No. 5,633,419 discloses a Ziegler-Natta catalyst supported on agglomerates for the polymerization of olefins.

SUMMARY OF THE INVENTION

It has been found that significant improvements in ethylene polymer MFR and activity of the catalyst can be achieved by modifying the catalyst of Spencer et al to include certain alkyl substituted pyridines as electron donor to improve MFR and by simultaneously controlling the magnesium compound to be organomagnesium, rather than magnesium alkoxides to improve activity of the catalyst.

Accordingly, one aspect of the present invention provides a catalyst component adapted for ethylene polymerization prepared by the process comprising:

(a) impregnating particulate inorganic oxide support with at least one organomagnesium compound to form a first reaction product;

(b) halogenating the first reaction product to convert the organomagnesium derived component thereof to magnesium halide, thereby forming a second reaction product;

(c) treating the second reaction product with:
  (i) at least one Group 4 or 5 transition metal compound,
  (ii) at least one alkyl di- or tri-substituted pyridine electron donor wherein the substitutents are at least located at the 2- and 6- positions, and optionally at the 3-, 4-, or 5- position, of the aromatic pyridine ring, and optionally
  (iii) at least one Group 2 or 13 organometal compound.

In another aspect of the present invention, there is provided a process for preparing the above catalyst component.

In a still further aspect of the present invention, there is provided a method for polymerizing ethylene using the above described catalyst component.

DETAILED DESCRIPTION OF THE INVENTION

All references herein to elements or metals belonging to a certain Group refer to the Periodic Table of the Elements published by Hawley's Condensed Chemical Dictionary, 12th Ed.. Also, any reference to the Group or Groups shall be to the Group or Groups as reflected in the Periodic Table of the Elements using the IUPAC new notation system for numbering groups. The term hydrocarbyl as employed herein means any aliphatic, cycloaliphatic, or aromatic group, or any combination thereof. The term "organo" means a hydrocarbyl group which does not possess an oxygen linkage between it and the element to which it is attached.

All particle size and particle size distribution measurements described herein are determined by a Mastersizer unit from Malvern, which operates on the principle of laser light diffraction and is known to all familiar in the art of small particle analysis.

The terms "surface area" and "pore volume" refer herein to the specific surface area and pore volume determined by nitrogen adsorption using the B.E.T. technique as described by S. Brunauer, P. Emmett, and E. Teller in Journal of the American Chemical Society, 60, pp. 209–319 (1939).

Bulk density is measured by quickly transferring (in 10 seconds) the sample powder into a graduated cylinder which overflows when exactly 100 cc is reached. No further powder is added at this point. The rate of powder addition prevents settling within the cylinder. The weight of the powder is divided by 100 cc to give the density.

Particulate Support (A)

The particulate support can be granular or preferably in the form of any agglomerate of sub-particles. In either instance, the support preferably will possess a reactive surface towards the organomagnesium compound.

By a "reactive surface" is meant a plurality of sites on, and preferably attached to, the surface of the particulate support material, which sites are capable of abstracting the organomagnesium compound from a solution thereof, but are otherwise substantially inert. The reactive sites may be OH groups chemically bonded to the surface of a particulate inorganic oxide support material, or the oxygen atoms which bridge two metals of a metal oxide, such as the bridging oxygen in a siloxane group. These oxygen atoms can provide reactive sites when their attachment to one of the metals is broken by processing. Preferred reactive sites are residual OH groups remaining on the support after bulk water has been removed.

The particulate support is desirably substantially inert in that, whereas the —OH groups are capable of reacting with the organomagnesium compound, the bulk of the material is essentially chemically inert.

Particularly good examples of such include solid inorganic oxides such as silica, alumina, titanium oxide, thorium oxide, and mixed oxides of silica and one or more Group 2 or 13 metal oxides, such as silica-magnesia, silica-alumina, and mixed oxides. Silica alumina, and mixed oxides of silica and one or more Group 2 or 13 metal oxides are the preferred support materials. Preferred examples of such mixed oxides are the silica-aluminas containing a high amount of silica, such as zeolites and zeolites subjected to a dealumination treatment to increase the silica/alumina ratio. Most preferred is silica.

The solid support may contain minor amounts, up to about 5000 parts per million on a weight basis, of additional elements not detrimentally affecting the catalytic activity of the supported catalyst, usually in the form of an oxide.

While the reaction of the particulate support typically proceeds through the surface OH groups of the support, it is necessary to remove bulk water from the support. This has the effect of reducing the hydroxyl content, particularly the surface hydroxyl content of the support. Control, i.e. lowering, of the hydroxyl content is desired in part to reduce the amount of magnesium halide eventually present on the support surface after treatment with the halogenating agent. High quantities of halogen containing materials in the catalyst are undesired from an environmental standpoint.

Thus, the hydroxyl group content of the support is controlled to be typically not greater than about 7 (e.g., 0.1 to 7), preferably not greater than about 5, (e.g., 0.5 to 5), and most preferably not greater than about 2 (e.g., 0.5 to 2) m mole hydroxyl groups per gram of solid support.

The support hydroxyl content is quantified by measuring the water loss of the support upon thermal treatment thereof at 950° C.

The hydroxyl group content can be controlled chemically, or preferably thermally, i.e. by calcination. When calcination is employed, it will typically be conducted for sufficient temperature and time to reduce the total volatiles to between about 0.1 and 8 weight % where the total volatiles are determined by measuring the weight loss upon destructive calcination of the sample at 950° C. Accordingly, calcination will typically be conducted by heating the support to temperatures of typically from about 150 to about 850° C., and preferably from about 200 to about 800° C. for periods of typically from about 1 to about 600 (e.g. 50 to 600), and preferably from about 50 to about 300 minutes. The atmosphere of calcination can be air or an inert gas. Calcination should be conducted to avoid sintering.

The hydroxyl groups can also be removed chemically by treating the support material with $SiCl_4$, hexamethyl disilazane, chloro-silanes, silylamines, aluminum alkyls, and the like, at a temperature of from about −20° C. to about 120° C., more preferably from about 0° C. to 40° C. for usually less than about 30 minutes.

Thermal treatment is preferred because it also removes bulk water.

The morphological properties of specific surface area, pore volume, and average particle size of the support can vary depending on whether the support is granular or in the form of an agglomerate.

For granular support, the metal oxide is typically employed as a powder having a specific surface area of typically from about 100 to about 1,000, preferably from about 150 to about 800, and most preferably from about 200 to about 600 m$^2$/gm; an average pore volume of typically from about 0.3 to about 3.0, preferably from about 0.8 to about 2.5, and most preferably from about 1.1 to about 2.2 cc/gm; and an average particle size of typically from about 5 to about 200 microns, the particular particle size selected being a function of the polymerization technique employed as described hereinafter.

Granular particulate supports can be prepared by any method known in the art, such as described in U.S. Pat. No. 5,321,105; EP 653,378; and PCT Pub. Nos. WO9533777 and WO9533778.

As indicated above, it is preferred that at least 50, preferably at least 75, most preferably at least 90% by weight of the support particles be in the form of an agglomerate of sub-particles.

As used in the present invention, the term "agglomerate of sub-particles" in reference to the texture of a support particle means that such a support particle is composed of more than one sub-particle held together by a variety of physical-chemical forces. Such agglomerates are preferably spheroidal in shape.

Typical morphological properties which characterize the agglomerate particles is an average particle size of typically from about 1 to about 250 (e.g., about 8 to about 25), and preferably from about 10 to about 150 (e.g., about 20 to about 120) microns; a surface area of typically from about 1 to about 1000, preferably from about 150 to about 800, and most preferably from about 200 to about 600 (e.g., 500 to 600) m$^2$/gm; an average pore volume of typically from about 0.2 to about 5.0, preferably from about 0.3 to about 3.0, and most preferably from about 0.5 to about 2.5 cc/gm; a bulk density of typically from about 0.1 to about 0.35 g/cc (e.g. about 0.16 to about 0.27 g/cc); and an agglomerate particle size distribution such that typically from about 30 to about 90, preferably from about 40 to about 90, and most preferably from about 50 to about 90% of the agglomerate particles possess the desired average particle size.

The average particle size of the constituent sub-particles in the agglomerate typically will range from about 0.1 to about 25 (e.g., 0.1 to about 10), preferably from about 1 to about 15 (e.g., 4 to about 9), and most preferably from about 4 to about 12 (e.g. 4 to about 7) microns.

Suitable agglomerates preferably are derived by spray drying a slurry of inorganic oxide particles.

Representative examples of suitable agglomerate supports are described in U.S. Pat. No. 5,633,419, and preferably U.S. Ser. No. 878,476, filed Jun. 19, 1997, the disclosures of which are herein incorporated by reference. The latter discloses frangible agglomerates made by spray drying a slurry of particles derived from dry milled, preferably a mixture of dry milled and wet milled inorganic oxide, preferably silica gel, particles.

The particular particle size and particle size distribution sought to be imparted to the support particles within the aforedescribed ranges is dictated and controlled by the type of polymerization reaction in which the ultimate supported catalyst will be employed. For example, a solution polymerization process typically can employ an average particle size of from about 2 to about 10 microns; a continuous stirred tank reactor (CSTR) slurry polymerization process of from about 8 to about 25 microns; a loop slurry polymerization process of from about 10 to about 150 microns; and a gas phase polymerization process of from about 20 to about 120 microns. Moreover, each polymer manufacturer has its own preferences based on the particular reactor configuration.

Organomagnesium Compound (B)

The organomagnesium compound can be represented by the formula $R^1MgR^2$, wherein $R^1$ and $R^2$ are the same or different aliphatic, cycloaliphatic, aromatic group, and any combinations thereof in the same group, more typically alkyl, cycloalkyl, aryl, and aralkyl and alkaryl groups having 1 to 20 carbon atoms.

Examples of the organomagnesium compounds include dimethyl magnesium (magnesium is abbreviated as Mg hereinafter), diethyl Mg, ethylmethyl Mg, dipropyl Mg, diisopropyl Mg, ethyl propyl Mg, dibutyl Mg, diisobutyl Mg, di-sec-butyl Mg, di-tert-butyl Mg, butyl ethyl Mg, butyl propyl Mg, sec-butyl ethyl Mg, tert-butyl isopropyl Mg, sec-butyl tert-butyl Mg, dipentyl Mg, diisopentyl Mg, ethyl pentyl Mg, isopropyl pentyl Mg, sec-butyl pentyl Mg, dihexyl Mg, ethyl hexyl Mg, butyl hexyl Mg, tert-butyl hexyl Mg, (2-ethybutyl) ethyl Mg, (2,2-diethylbutyl) ethyl Mg, diheptyl Mg, dioctyl Mg, di-2-ethylhexyl Mg, di(methylcyclohexyl) Mg, diphenyl Mg, ethyl phenyl Mg, butyl phenyl Mg, sec-butyl phenyl Mg, ditolyl Mg, ethyl tolyl Mg, dixylyl Mg, dibenzyl Mg, and benzyl tert-butyl Mg. The most preferred organomagnesium compound is n-butylethyl Mg.

These organomagnesium compounds may be used in the form of a mixture or complex compound with an organic compound of other metals which can be represented by the formula $MR^3_n$ (where M denotes boron, beryllium, aluminum, or zinc; $R^3$ denotes an alkyl, cycloalkyl, aryl, or aralkyl group having 1 to 20 carbon atoms; and n denotes the valence of the metal M). Their examples include triethyl aluminum, tributyl aluminum, triisobutyl aluminum, triphenyl aluminum, triethyl boron, tributyl boron, diethyl beryllium, diisobutyl beryllium, diethyl zinc, and dibutyl zinc.

Where the organomagnesium compound is used in the form of a mixture or complex compound of other metals, the amount of other metals is usually less than 5, and preferably less than 2 moles per mole of magnesium.

Halogenating Agent (C)

Halogenating agents capable of halogenating the organomagnesium compound include hydrogen halides, silicon halides of the formula $R^4_bSiX^2_{4-b}$ wherein $R^4$ is hydrogen or hydrocarbyl, $X^2$ is halogen, and b is 0, 1, 2, or 3, carboxylic acid halides, hydrocarbyl halides, boron halides, phosphorus pentachloride, thionyl chloride, sulfuryl chloride, phosgene, nitrosyl chloride, a halide of a mineral acid, chlorine, bromine, a chlorinated polysiloxane, a hydrocarbyl aluminum halide, aluminum trichloride and ammonium hexafluorosilicate.

Preferably, the halogenating agent is selected from the group consisting of alkyl aluminum halides, advantageously alkyl aluminum sesqui- or dihalides, hydrogen halides, silicon halides, and boron halides. Preferably, the halogenating agent is a chlorinating agent. Most preferably, it is hydrogen chloride, High purity anhydrous hydrogen chloride is preferred which contains less than 10 parts per million oxygen and less than 5 parts per million water. Highly preferred in the practice of the present invention is the use of a dialkyl magnesium compound in combination with a hydrogen halide, especially hydrogen chloride. The by-product of the halogenation step is then an alkane or two alkanes which can be easily separated from the second reaction product. Other halogenating agents such as aluminum, boron or silicon halides leave aluminum, boron or silicon residues in the product. In addition, alkyl aluminum halides are strong reducing agents and their presence during the addition of the transition metal compound can lead to its reduction in solution and not on the support. Reduction of transition metal compound in the solution is not desired as it may give less desirable bulk density and particle size properties to the polymer produced with such a catalyst. The use of hydrogen halide lowers these problems and does not increase the metal content of the eventual catalyst and thus polymer.

Group 4 or 5 Transition Metal Compound (D)

The Group 4 or 5 transition metal compound employed in the present invention preferably is a halide, hydrocarbyloxide, or mixed halide/hydrocarbyloxide of titanium zirconium, hafnium, or vanadium.

Suitable Group 4 transition metal compounds are represented by the formula $M^2X^3_{4-a}(OR^5)_a$, wherein $M^2$ is titanium, zirconium or hafnium, each $R^5$ is independently an alkyl group having from 1 to about 20, preferably from about 1 to about 10, and more preferably from 2 to about 8 carbon atoms; $X^3$ is a halogen atom, preferably chlorine, and has a value of from 0 to 4. Particularly suitable titanium compounds are tetravalent and include, for example, titanium tetrachloride, titanium tetrabutoxide, titanium tetraisopropoxide chloride, and combinations thereof. Analogous zirconium and hafnium compounds are also suitable.

Suitable Group 5 transition metal compounds preferably are vanadium compounds such as those represented by the formulas $VX^4_3$, $VX^4_4$ and $V(O)X^4_3$, wherein each $X^4$ is independently $OR^6$ or a halide atom, preferably chloride, and each $R^6$ is independently an alkyl group having from 1 to about 20, preferably from about 2 to about 8, and more preferably from about 2 to about 4 carbon atoms. Particularly suitable vanadium compounds include vanadium trichloride, vanadium tetrachloride, vanadium trichloride oxide, vanadium triethoxide oxide, and combinations thereof.

Mixtures of Group 4 and 5 transition metal compounds, preferably of titanium and vanadium, may be employed to control molecular weight and molecular weight distribution of the polymers produced. Most preferred is titanium tetrachloride.

Electron Donor (E)

The electron donor of the present invention is alkyl substituted pyridine wherein the alkyl substituents are located at least at the 2- and 6- positions of the aromatic pyridine ring. More specifically, the electron donor can be represented by the following structural formula:

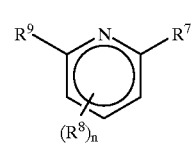

I wherein $R^7$ to $R^9$ are independently alkyl, typically $C_1$, to $C_{10}$ alkyl, preferably $C_1$ to $C_5$ alkyl, and most preferably $C_1$ to $C_3$ (e.g., $C_1$) alkyl, and n is 0 or 1, preferably 1.

Representative examples of suitable electron donors include 2,6-dimethyl pyridine (also known as 2,6-lutidine); 2,4,6-trimethyl pyridine; 2,3,6-trimethyl pyridine; 2,5,6-trimethyl pyridine; 2,6-diethyl pyridine; 2,4,6-triethyl pyridine; 2-ethyl-6-methyl pyridine; 2,6-dimethyl-4-ethyl pyridine; 2,6-dioctyl pyridine; 2,6-dihexyl pyridine, and mixtures thereof.

Group 2 or 13 Organometal Compound (F)

According to the present invention, the supported catalyst component described above may further comprise a Group 2 or 13 organometallic compound. Suitable examples of Group 13 compounds are represented by the formula $R^{10}_y M^3 X^5_z$, wherein $M^3$ is a Group 13 metal, preferably aluminum or boron, each $R^{10}$ is independently an alkyl group having from 1 to about 20, preferably from about 1 to about 10, and more preferably from about 2 to about 8 carbon atoms, $X^5$ is a halogen atom, preferably chloro, y and z can each independently having a value from 1 to a value equal to the valence of $M^3$, and the sum of y and z equals the valence of $M^3$. More preferably, the organometallic compound is an alkyl aluminum halide. Particularly suitable compounds include ethyl aluminum dichloride, ethyl aluminum sesquichloride, diethyl aluminum chloride, isobutyl aluminum dichloride, diisobutyl aluminum chloride, octyl aluminum dichloride, and combinations thereof.

Method of Preparation

The supported catalyst component of the invention can be obtained by impregnating the solid particulate Support (A) with organomagnesium compound (B) under conditions to form a first reaction product (of support and organomagnesium compound), followed by halogenation of the organomagnesium derived component of the first reaction product with halogenating agent (C), to form a second reaction product (containing magnesium halide), and optionally recovering the second reaction product. The second reaction product is then treated with Components (D), (E), and optionally (F), as described hereinafter.

More specifically, the organomagnesium compound is applied to the support with an organic solvent, preferably non-polar solvent, capable of dissolving or suspending the organomagnesium compound. Typically, the solid support is suspended in the solution of organomagnesium compound and agitated for a sufficient amount of time, generally for 0.1 to 10 hours.

Although the solid support component (A) can be added to the other components in an appropriate medium, it is preferred to first slurry the solid support (A) in a hydrocarbon diluent. Suitable hydrocarbon media which can be employed to slurry solid support (A), and which can serve as diluent or solvent for any of the other components employed in the present invention include, aliphatic hydrocarbons, aromatic hydrocarbons, naphthenic hydrocarbons, and combinations thereof. Particularly suitable hydrocarbons include, for example, pentane, isopentane, hexane, heptane, octane, isooctane, nonane, isononane, decane, cyclohexane, methylcyclohexane, toluene, and combinations of two or more of such dilutents. The most preferred solvent/diluent is heptane.

Suitable concentrations of solid support in the hydrocarbon medium range from about 0.1 to about 50, preferably from about 5 to about 30, and more preferably from about 10 to about 20 weight percent.

It is preferred to combine the slurry of support (A) with the organomagnesium compound (B), preferably dissolved in a hydrocarbon which may be the same or different from the hydrocarbon in which (A) is slurried.

Suitable weight ratios of the organomagnesium compound:solid support in the resulting slurry mixture can vary from about 0.05:1 to about 0.5:1, preferably from about 0.1:1 to about 0.4:1. The above ratios are controlled to impregnate the support with an amount of organomagnesium compound such that when halogenated to form magnesium halide, the amount of such magnesium halide chemically adsorbed onto the support is typically from about 0.3 to about 5, preferably from about 1 to about 4, and more preferably from about 1 to about 3 mmoles of organomagnesium compound per gram of support.

A contact time between the solid support (A) and the organomagnesium compound (B), will typically range from about 0.1 to about 10, preferably from about 0.2 to about 8, and more preferably from about 0.5 to about 4 hours, at temperatures of typically from about −20 to about 150, preferably from about 0 to about 100, and most preferably from about 20 to about 70° C. In case a polar solvent is used, it is preferably removed prior to adding the other components. Typically, this can be done by evaporation or distillation. The contacting of particulate support is typically conducted to cause at least some of the magnesium in the organomagnesium compound to bond directly to the particulate support through an oxygen atom present on the support. Desirably, at least 50, preferably at least 75, and most preferably at least 90 mole % of the magnesium in the organomagnesium compound bonds directly with the support.

After the solid support is impregnated with a solution of the organomagnesium compound, and the first reaction product formed, it is halogenated with a halogenating agent.

Although at lower amounts of halogenating agent (C), improvements can be obtained with respect to lower chloride residues in the catalyst and thus eventual polymer, preferably the amount of (C) is sufficient to convert substantially all of organomagnesium derived component of the first reaction product to magnesium dihalide. By "substantially all" is meant at least 90, preferably at least 95, and most preferably at least 99 mole percent. If too much organomagnesium derived component is left when transition metal compound (D) is added, this may lead to over-reduction of compound (D).

Preferably, halogenating agent (C) is added to the first reaction product, advantageously in a hydrocarbon medium. If component (C) under the reaction conditions is a gas or liquid, no further diluent or solvent is required. In case (C) is a solid, the same is preferably incorporated in a diluent or solvent. If (C) is a gas, it is preferably bubbled through the first reaction product. The contact time should be sufficient to achieve the desired extent of halogenation. Usually the contact time is from about 0.1 to about 100, preferably from about 0.2 to about 20, and more preferably from about 0.5 to about 10 hours.

At this point in the process, the solvent or diluent can be separated from the resulting second reaction product (also referred to as Reaction Product 2 or RP2) by evaporation, filtration, or decantation. Alternatively, the further components can be added without this isolation step. Reaction Product 2 is unstable in an atmosphere containing oxygen and moisture, and prior to adding any further component, the oxygen and moisture should be carefully removed. Therefore, storage is preferably under an inert atmosphere, for example, nitrogen.

Addition of components (D), (E), and optionally (F) is accomplished by contacting these components with Reaction Product 2 in any of the following ways:

(1) RP2 and transition metal compound (D) are contacted with each other, and the resulting product contacted with (E) and then optionally (F);

(2) RP2 and electron donor (E) are contacted with each other, and the resulting product contacted with (D) and optionally (F);

(3) RP2, component (D), component (E), and optionally component (F) are contacted with each other simultaneously;

(4) in the most preferred sequence, components (D) and (E) are contacted with each other to form a complex of transition metal compound (D) and electron donor (E), and the complex contacted with RP2, optionally followed by contact of the resulting product with (F); or (5) RP2 is sequentially contacted with (D), (F), and then (E).

The above-mentioned contacting may be accomplished by mixing and stirring or mechanically copulverizing RP2 and the three components (D), (E), and (F) in the absence, but preferably the presence, of an inert organic diluent. Examples of the inert organic diluent include hydrocarbons such as pentane, hexane, heptane, oxtane, decane, cyclohexane, benzene, toluene, and xylene, and halogenated hydrocarbons such as 1,2-dichloroethane, 1,2-dichloropropane, carbon tetrachloride, butyl chloride, isoamyl chloride, bromobenzene, and chlorotoluene.

Typical contact temperatures for RP2, (D), (E), and (F) can range from about −20 to 150, preferably from about 0 to about 100, and most preferably from about 20 to about 70° C., for periods of from about 0.1 to about 100 hours for mechanical copulverization, and for about 0.5 to about 20 hours with mixing and stirring in a liquid diluent. Where the contacting times involve heat generation, contacting may be performed in such a manner that the components are mixed little by little at a low temperature in the initial stage, and after the mixing of the entire components is complete, the temperature is increased and contacting is continued. Although not preferred, at the interval between contacting steps, the contact product may be washed with one of the above-mentioned diluents.

The above-described contacting process steps should be conducted under an inert atmosphere to exclude air (oxygen) and moisture as much as possible.

The transition metal compound (D) is employed in amounts sufficient to impart a molar ratio of the transition metal in D:Mg in the magnesium halide in the final product of typically from about 0.01:1 to about 1:1, preferably from about 0.03:1 to about 0.5:1, and most preferably from about 0.06:1 to about 0.4:1.

The electron donor (E) is employed in amounts sufficient to impart a molar ratio of electron donor (E) to transition metal in D (E:D) of typically from about 0.005:1 to about 100:1, preferably from about 0.01:1 to about 10:1, and most preferably from about 0.05:1 to about 5:1.

The amount of the optional Group 2 or 13 organometal compound (F) is sufficient to impart a mole ratio of F:D in the final product of typically from about 0:1 to about 100:1, preferably from about 0:1 to about 50:1, and most preferably from about 2:1 to about 20:1, the final product being the product of RP2, (D), (E), and, optionally, (F).

Where the transition metal compound and electron donor are to be complexed before contact with the second reaction product, this can be accomplished by admixing the transition metal compound (e.g., TiCl$_4$) and the electron donor in a suitable organic diluent or solvent as described above in accordance with the target amounts described above individually for each member of the complex. Suitable temperatures to achieve complexation range typically from about −20 to about 150, preferably from about 0 to about 100° C.

In a highly preferred supported catalyst component, (A) is an agglomerated solid silica support, (B) is dialkyl magnesium, (C) is HCl (D) is a halide of titanium, zirconium, hafnium, or vanadium, (E) is 2,6-dimethyl pyridine or 2,4,6-trimethyl pyridine and (F) is an alkyl aluminum halide. Even more preferably in such a component, there is 1.0 to 3.0 mmole of MgCl$_2$ affixed to the solid support per gram of the solid support (A), (D) is titanium tetrachloride or vanadium trichloride or a mixture thereof, the mole ratio of transition metal in (D) to Mg in the Mg halide is from 0.5:1 to 0.02:1, (E) is 2,6-dimethyl pyridine, and (F) is an alkyl aluminum halide, e.g. diethyl aluminum chloride, and the mole ratio of (E) to (D) is from 0.1:1 to 100:1.

The supported catalyst component thus prepared can be employed, without separation or purification, in the polymerization of olefins as described hereinafter. Alternatively, the catalyst component can be stored in the hydrocarbon medium, or isolated from the hydrocarbon medium and dried and stored under inert conditions for an extended period of time, for example, for one to several months.

According to a further aspect of the present invention, there is provided an olefin polymerization supported catalyst composition comprising the catalyst component of the present invention containing components (A), MgCl$_2$, (D), (E), and optionally (F), as described herein in combination with a cocatalyst.

Suitable cocatalysts include, for example, alumoxanes and compounds corresponding to the formula $R^{11}{}_z GX^4{}_{3-z}$, wherein G is aluminum or boron, $R^{11}$ independently upon each occurrence is hydrocarbyl, $X^4$ independently upon each occurrence is halide or hydrocarbyloxide, and z is a number from 1 to 3. Preferred compounds of this formula are those wherein z is 2 or 3, most preferably 3. Particularly suitable compounds include triethylaluminum, trimethylaluminum, dimethylaluminum hydride, triisobutylaluminum, trihexylaluminum, trioctylaluminum, diethylaluminum chloride, diethyl-aluminum ethoxide, diisobutylaluminum hydride, and combinations of two or more of such compounds.

Suitable alumoxanes include those represented by the formula $(Al(O)R^{12})_x$ wherein $R^{12}$ is an alkyl group having from 1 to about 8 carbon atoms and x has a value greater than about 5. Particularly suitable alumoxanes include, for example methylalumoxane, hexaisobutyltetraalumoxane, and combinations thereof. Also, mixtures of alumoxanes with alkylaluminum compounds such as, for example, triethylaluminum or tributylaluminum can be employed.

The catalyst components and compositions of the present invention can be advantageously employed in high pressure, solution, slurry, and gas phase polymerization processes. As used herein, the term polymerization includes homopolymerization, copolymerization and terpolymerization.

Methods and apparatus for effecting such polymerization reactions are well known. The supported catalyst according to the present invention can be used in similar amounts and under similar conditions known to olefin polymerization catalysts of the Ziegler-Natta type. Typically, for the slurry process, the temperature is from approximately 0° C. to just below the temperature at which the polymer becomes soluble in the polymerization medium. For the gas phase process, the temperature is from about 0° C. to just below the melting point of the polymer. For the solution process, the temperature is typically the temperature from which the polymer is soluble in the reaction medium, up to approximately 275° C.

The pressure used can be selected from a relatively wide range of suitable pressures, e.g., from subatmospheric to about 1000 psi, and most preferred from 50 to 550 psi. In the slurry or particle form process, the process is suitably performed with a liquid inert diluent such as a saturated aliphatic hydrocarbon. The hydrocarbon is typically a $C_4$ to $C_{10}$ hydrocarbon, e.g., isobutane or an aromatic hydrocarbon liquid such as benzene, toluene, or xylene. The polymer is recovered directly from the gas phase process or by filtration or evaporation from the slurry process, or evaporation of solvent from the solution process.

The support and catalyst system of the present invention is particularly suited for the gas phase and slurry phase polymerization processes, and particularly useful for the production of polyethylene to form such polymers as low density polyethylene (LDPE), linear low density polyethylene (LLDPE), and high density polyethylene (HDPE). Such materials are typically employed to form cast or blown films, coatings, sheets, injection molded articles and the like. Such polymers are not stereo specific and, in fact, the advantages of the supported catalyst of the present invention do not relate to the stereo regularity of the polymer.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, conditions, physical states or percentages, is intended to literally incorporate expressly herein any number falling within such range, including any subset of numbers within any range so recited.

Examples 1 to 4

The following procedure was employed to prepare various catalyst components:

Part A

Three different silica samples were provided and designated Samples S-1 to S-3, respectively. Each of these silica samples constitute agglomerates of primary silica particles.

Samples S-1 and S-3 were derived from silica hydrogel which has been wet milled and spray dried from an aqueous slurry, generally in accordance with Comparative Example 1 of U.S. Ser. No. 878,476, filed Jun. 19, 1997. The morphological properties are summarized at Table 1.

Sample S-2 was also a spray dried agglomerate of silica hydrogel prepared generally in accordance with Example 4 of U.S. Ser. No. 878,476, filed Jun. 19, 1997, by combining wet and dry milled samples of the silica gel. The properties of the spray dried agglomerate of S-2 are also collectively reported at Table 1. The surface area of samples S-1 to S-3 range between 300 and 550 m²/g.

TABLE 1

| Silica Sample No. | Pore Volume (cc/g) | Agglomerate Particle Size (microns) | | |
|---|---|---|---|---|
| | | 10% | 50% | 90% |
| S-1 | 1.63 | 11 | 48 | 101 |
| S-2 | 1.34 | 18 | 53 | 99 |
| S-3 | 1.60 | 18 | 52 | 86 |

Each of the silica samples S-1 to S-3 was then calcined at 600° C. for about 4 hours, thereby imparting an hydroxyl content of 1 mmole or less OH per gram of silica.

Part B 10.0 g of silica, previously calcined at 600° C. for 4 hours, was slurried in 50 ml of heptane. Dialkyl-magnesium of the type and in the amounts reported at Table 2 was added dropwise as a 15 wt % solution thereof in heptane, and the slurry was stirred for 1 hour. Anhydrous hydrogen chloride was bubbled through the suspension for 10 minutes (or until an aliquot of the suspension was slightly acidic). The exothermic heat of reaction is not attempted to be controlled by cooling. Excess HCl was removed by purging the flask with argon for 10 minutes. The yellow/off-white slurry was treated with the TiCl₄ (either neat or as a 20 wt % solution in heptane) in amounts reported at Table 2, and stirred for 1 hour. Diethylaluminum chloride (DEAC) was added dropwise, in the amounts reported at Table 2, and stirring continued for 2 hours. Electron donor, in the amounts reported at Table 2, was added, followed by an additional hour of stirring. Volatiles were removed under vacuum at 50° C. to yield a free-flowing powder. This procedure was employed for Runs 2 to 14.

Part C

The procedure of Part B was repeated except that TiCl₄ was preconditioned with the electron donor prior to addition to the halogenated magnesium compound. Preconditioning is achieved by mixing a 10 wt % solution of TiCl₄ in heptane with a 10 wt % solution of electron donor in heptane, and stirring at room temperature for 0.5–1 hour. While not wishing to be bound by any particular theory, it is believed that the preconditioning causes a complex of TiCl₄ and electron donor to form.

The combined solution containing the preconditioned TiCl₄ was then added to the Mg/Si slurry after halogenation in amounts sufficient to achieve the Ti:Si-support mole ratio reported at Table 2. DEAC was then added last as reported at Table 2, stirred for 2 hours, and dried under vacuum at 50° C. to yield free-flowing powder.

This preparation was employed for Run 1.

Comparative Examples 1 to 10

The procedure of Example 1, Part B, was repeated using the various catalyst components as reported at Table 2. More specifically, butylethylmagnesium was replaced with butylethylmagnesium butoxide, referred to as BEMB available from Akzo Nobel. BEMB is the reaction product of butylethyl-magnesium (BEM) with butanol. During this reaction, either the butyl group or the ethyl group of the BEM is hydrolyzed by the butanol to give either butylmagnesium butoxide or ethylmagnesium butoxide, respectively. Thus, BEMB represents a mixture of butylmagnesium butoxide and ethylmagnesium butoxide, and for convenience, is referred to as butylethylmagnesium butoxide.

Example 4 (Polymerization)

In the slurry polymerization experiments of this Example, unless otherwise indicated, a 2-liter Zipperclave (Autoclave Engineers, Inc.) reactor was rendered inert by heating under vacuum at 80° C. for 2 hours. A reactor charge consisting of 300 ml of dry, degassed heptane, 700 micromoles of triisobutylaluminum co-catalyst, unless otherwise indicated, in the amount of catalyst indicated in Table 1, was admitted to the reactor. A final reactor pressure of 180 psig was quickly attained comprising a hydrogen/ethylene partial pressure ratio of 0.5. The polymerization temperature was 85° C., unless otherwise indicated. Ethylene was supplied on demand via a mass flow controller to maintain the reactor pressure at 180 psig. After 60 minutes, the ethylene feed was stopped and the reactor cooled and vented. The polymer was treated with acetone to deactivate any residual catalyst, filtered, and dried under vacuum to constant weight. After drying, the polymer was weighed to calculate catalyst activity and a sample of dried powder was used to determine apparent bulk density according to the procedure of ASTM 1895 (unsettled bulk density). Another sample of this polymer was treated with a standard antioxidant package and Melt Index (MI) is determined according to ASTM D1238 Condition E; High Load Melt Index (HLMI) by ASTM D1238 Condition F. Melt Flow Ratio (MFR) is determined by dividing HLMI by MI. The results for each catalyst are reported at Table 2.

Discussion of Results

Examples 1–4 demonstrate the benefits of using 2,6-dimethyl pyridine (2,6-lutidine) or 2,4,6-trimethyl pyridine (2,4,6-collidine) in the catalyst preparation. Resin produced from these catalysts possesses low MFR and relatively high bulk density.

For example, comparing Run 2 (Example 2) and Run 8 (Comp. Ex. 5), while the overall productivity of the catalyst in Run 2 is lower (4290 vs. 8860 g/g-hr. for Run 8), the MFR of Run 2 is significantly lower (27.9 vs. 37.6) and the bulk density is improved (0.35 g/cc vs. 0.26 g/cc). Furthermore, comparison of Runs 4 and 5 (Comp. Examples 1-2) with Runs 1-3 (Examples 1–4), demonstrates that donors with 2,6- or 2,4,6-substitution pattern, induce significant MFR reduction relative to the 3,5-substitution pattern.

Similar results on MFR are observed with other aromatic electron donors employed for Runs 6, 7 and 10.

Run 12 (Example 4) and Run 11 (Comparative Example 8) directly compare the effect of substituting an alkoxyalkylmagnesium (BEMB) for a dialkylmagnesium (BEM). Surprisingly, it has been found that a substantial reduction in activity results when BEMB is used, yet polymer properties are relatively similar.

Runs 9, 13 and 14 (Comparative Examples 6, 9 and 10) further illustrate this effect. As in the previous case, BEMB yields a significantly lower activity catalyst. The above results are not suggested in the prior art, which treats alkoxyalkyl and dialkylmagnesium reagents as being essentially interchangeable.

It has been further found that use of specified donors in conjunction with dialkylmagnesium reagents yields high activity catalysts which produce desirably low MFR resins.

TABLE 2

| Run No. | Ex. or Comp Ex. No. | Silica Type | gm. | Mg Compound Name | mmole (Mg/gm support) | TiCl$_4$ (mmole Ti/gm support) | DEAC (mmole/ gm support) | Electron Donor Name | (mmole/ gm support) | Catalyst Activity* | Polymer Properties MI | MFR | ABD |
|---|---|---|---|---|---|---|---|---|---|---|---|---|---|
| 1 | Ex 1 | S-1 | 10.0 | BEM | 2.5 | 0.52 | 3.75 | 2,6-DMP | 0.26 | 7030 | 2.30 | 27.2 | 0.34 |
| 2 | Ex 2 | S-1 | 10.0 | dibutyl Mg | 2.5 | 0.36 | 3.1 | 2,6-DMP | 0.36 | 4290 | 2.27 | 27.9 | 0.35 |
| 3 | Ex 3 | S-1 | 10.0 | dibutyl Mg | 2.5 | 0.43 | 3.75 | 2,4,6-TMP | 0.38 | 4580 | 2.36 | 28.8 | 0.30 |
| 4 | Comp Ex 1 | S-1 | 10.0 | dibutyl Mg | 2.5 | 0.43 | 3.75 | 3,5-DMP | 0.40 | 5100 | 2.29 | 32.5 | 0.29 |
| 5 | Comp Ex 2 | S-1 | 10.0 | dibutyl Mg | 2.5 | 0.52 | 3.75 | 3,5-DMP | 0.26 | 5670 | 1.77 | 32.4 | 0.29 |
| 6 | Comp Ex 3 | S-1 | 10.0 | dibutyl Mg | 2.5 | 0.38 | 3.1 | 2-ANAP | 0.40 | 4760 | 3.00 | 32.7 | 0.32 |
| 7 | Comp Ex 4 | S-1 | 10.0 | dibutyl Mg | 2.5 | 0.38 | 3.1 | DMAP | 0.26 | 5080 | 3.03 | 33.5 | 0.30 |
| 8 | Comp Ex 5 | S-1 | 10.0 | dibutyl Mg | 2.5 | 0.36 | 3.1 | None | 0 | 8860 | 1.66 | 37.6 | 0.26 |
| 9 | Comp Ex 6 | S-2 | 10.0 | dibutyl Mg | 2.5 | 0.56 | 5.0 | None | 0 | 10260 | 1.2 | 35.7 | 0.25 |
| 10 | Comp Ex 7 | S-2 | 10.0 | dibutyl Mg | 2.5 | 0.56 | 5.0 | Pyridine | 0.39 | 8240 | 0.82 | 40.6 | 0.24 |
| 11 | Comp Ex 8 | S-3 | 10.0 | BEMB | 2.0 | 0.25 | 2.5 | 2,6-DMP | 0.25 | 1500 | 2.95 | 28.9 | 0.39 |
| 12 | Ex 4 | S-3 | 10.0 | BEM | 2.0 | 0.25 | 2.5 | 2,6-DMP | 0.25 | 2700 | 2.69 | 28.2 | 0.34 |
| 13 | Comp Ex 9 | S-2 | 10.0 | BEM | 2.6 | 0.52 | 3.75 | None | 0 | 9720 | 0.71 | 38.5 | 0.26 |
| 14 | Comp Ex 10 | S-2 | 10.0 | BEMB | 2.6 | 0.52 | 3.75 | None | 0 | 6580 | 1.34 | 35.8 | 0.27 |

ANAP = azanaphthylene
DMP = dimethyl pyridine
TMP = trimethyl pyridine
BEM = butylethylmagnesium
BEMB = butylethylmagnesium butoxide
DMAP = dimethylamino pyridine
DEAC = diethylaluminum chloride
MI = Melt Index
MFR = Melt Flow Ratio
ABD = Apparent Bulk Density
*Activity = gm Polymer/gm Catalyst/hr The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art, without departing from the spirit of the invention.

What is claimed is:

1. Catalyst component composition adapted for ethylene polymerization prepared by the process comprising:
   (a) impregnating particulate inorganic oxide support with at least one organomagnesium compound to form a first reaction product;
   (b) halogenating the first reaction product to convert the organomagnesium derived component thereof to magnesium halide, thereby forming a second reaction product;
   (c) treating the second reaction product with:
      (i) at least one Group 4 or 5 transition metal compound,
      (ii) at least one alkyl di- or tri-substituted pyridine electron donor wherein the substituents are at least located at the 2- and 6-positions, and optionally at the 3-, 4-, or 5- positions, of the aromatic pyridine ring, and optionally,
      (iii) at least one Group 2 or 13 organometal compound.

2. The catalyst component composition of claim 1 wherein the particulate support comprises an agglomerate of sub-particles wherein:
   (a) the agglomerate particles possess
      (i) an average particle size of from about 1 to about 250 microns;
      (ii) a surface area of from 1 to 1000 $m^2/gm$;
      (iii) an average pore volume of from about 0.2 to about 5.0; and
      (iv) an agglomerate particle size distribution such that from about 30 to about 90% of the agglomerate particles possess the above described average particle size; and
   (b) the average particle size of the constituent sub-particles in the agglomerate range from about 0.1 to about 25 microns.

3. The catalyst component composition of claim 2 wherein the particulate support possesses a reactive surface and at least some of the magnesium in the first reaction product is bonded directly to the particulate support through an oxygen atom present on the support.

4. The catalyst component composition of claim 1 wherein the particulate support is silica, the organo-magnesium compound is dialkyl magnesium, the halogenating agent is hydrochloric acid, the Group 4 or 5 transition metal compound is $TiCl_4$, and the electron donor is selected from the group consisting of 2,6-dimethyl pyridine, 2,4,6-trimethyl pyridine, and mixtures thereof.

5. The catalyst component composition of claim 4 wherein the Group 2 or 13 organometal compound is employed and is alkylaluminum halide.

6. The catalyst composition of claim 1 wherein the electron donor is contacted with the transition metal compound prior to contact with the second reaction product.

7. A process for the production of a catalyst component composition adapted for use in polymerizing ethylene which comprises:
   (a) impregnating particulate inorganic oxide support with at least one organomagnesium compound to form a first reaction product;
   (b) halogenating the first reaction product to convert the organomagnesium derived component thereof to magnesium halide, thereby forming a second reaction product;
   (c) treating the second reaction product with:
      (i) at least one Group 4 or 5 transition metal compound,
      (ii) at least one alkyl di- or tri-substituted pyridine electron donor wherein the substituents are at least located at the 2- and 6-positions, and optionally at the 3-, 4-, or 5- positions, of the aromatic pyridine ring, and optionally,
      (iii) at least one Group 2 or 13 organometal compound.

8. The process of claim 7 wherein the particulate support comprises an agglomerate of sub-particles wherein:
   (a) the agglomerate particles possess
      (i) an average particle size of from about 1 to about 250 microns;
      (ii) a surface area of from 1 to 1000 $m^2/gm$;
      (iii) an average pore volume of from about 0.2 to about 5.0; and
      (iv) an agglomerate particle size distribution such that from about 30 to about 90% of the agglomerate particles possess the above described average particle size; and
   (b) the average particle size of the constituent sub-particles in the agglomerate range from about 0.1 to about 25 microns.

9. The process of claim 8 wherein the particulate support possesses a reactive surface and at least some of the magnesium in the first reaction product is bonded directly to the particulate support through an oxygen atom present on the support.

10. The process of claim 7 wherein the particulate support is silica, the organo-magnesium compound is dialkyl magnesium, the halogenating agent is hydrochloric acid, the Group 4 or 5 transition metal compound is $TiCl_4$, and the electron donor is selected from the group consisting of 2,6-dimethyl pyridine, 2,4,6-trimethyl pyridine, and mixtures thereof.

11. The process of claim 7 wherein the Group 2 or 13 organometal compound is employed and is an alkylaluminum halide.

12. The process of claim 7 wherein the electron donor is contacted with the transition metal compound prior to contact with the second reaction product.

* * * * *